(12) United States Patent
Nguyen

(10) Patent No.: US 6,564,250 B1
(45) Date of Patent: *May 13, 2003

(54) MINICLIENT FOR INTERNET APPLIANCE

(75) Inventor: Julien T. Nguyen, Saratoga, CA (US)

(73) Assignee: Planetweb, Inc., Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,096

(22) Filed: Aug. 21, 1997

(51) Int. Cl.$^7$ .......................... G06F 17/00; G06P 15/16
(52) U.S. Cl. ...................... 709/208; 709/229; 709/247; 345/428; 345/864
(58) Field of Search ............... 395/200.79, 200.48, 395/200.49, 200.52; 345/428; 709/203, 229, 230, 231, 232, 246, 247, 248, 208; 346/733, 864, 2.1

(56) References Cited

U.S. PATENT DOCUMENTS

| | | |
|---|---|---|
| 5,377,354 A | 12/1994 | Scannell |
| 5,499,109 A | 3/1996 | Mathur et al. |
| 5,508,817 A | 4/1996 | Kunigami |
| 5,513,126 A | 4/1996 | Harkins |
| 5,548,789 A | 8/1996 | Nakanura |
| 5,619,648 A | 4/1997 | Canale |
| 5,623,603 A | 4/1997 | Jiang |
| 5,627,764 A | 5/1997 | Schutzman |
| 5,666,542 A | 9/1997 | Katai et al. |
| 5,675,507 A | 10/1997 | Bobo |
| 5,706,502 A | 1/1998 | Foley et al. |
| 5,710,883 A | 1/1998 | Hong |
| 5,724,574 A | 3/1998 | Stratigos et al. |
| 5,734,835 A * | 3/1998 | Selker .................. 395/200.79 |
| 5,737,599 A | 4/1998 | Rowe et al. |
| 5,737,619 A | 4/1998 | Judson |
| 5,742,768 A | 4/1998 | Gennaro et al. |
| 5,754,700 A * | 5/1998 | Kuzma .................. 382/236 |
| 5,754,765 A * | 5/1998 | Danneels et al. ...... 395/200.52 |
| 5,754,851 A | 5/1998 | Wissner |
| 5,761,673 A | 6/1998 | Bookman et al. |
| 5,764,235 A * | 6/1998 | Hunt et al. .................. 345/428 |
| 5,781,741 A | 7/1998 | Imamura et al. |
| 5,781,785 A | 7/1998 | Rowe et al. |
| 5,784,058 A | 7/1998 | LaStrange |

(List continued on next page.)

FOREIGN PATENT DOCUMENTS

WO     WO 99/50744 A1     10/1999

OTHER PUBLICATIONS

Bolot et al. "Scalable Feedback Control for Multicast Video Distribution in the Internet", Proceedings of the conference on Communications architectures, protocols and applications, 1994, pp. 58–67.*

(List continued on next page.)

*Primary Examiner*—Dung C. Dinh
(74) *Attorney, Agent, or Firm*—Swernofsky Law Group PC

(57) ABSTRACT

The invention provides a method and system for providing features for internet access at an internet appliance which go beyond the resource limitations of the internet appliance. The desired features are primarily implemented on the server, and coupled to the internet appliance for display, responsive to the ability of the internet appliance to provide those features. (1) The internet appliance and the server adapt to communication link limitations by dynamically adjusting picture quality or size for graphics to be displayed. (2) The internet appliance and the server adapt to memory and processor limitations by dynamically running applets at the server and intercepting display functions of applets for display at the internet appliance. (3) The internet appliance and the server adapt to memory and processor limitations by dynamically running editing programs or web pages at the server and by dynamically adjusting picture quality or size for graphics to be displayed.

21 Claims, 1 Drawing Sheet

U.S. PATENT DOCUMENTS

| | | | |
|---|---|---|---|
| 5,784,553 A | | 7/1998 | Kowala et al. |
| 5,787,470 A | | 7/1998 | DeSimone et al. |
| 5,794,039 A | * | 8/1998 | Guck .................... 395/683 |
| 5,794,259 A | | 8/1998 | Kikinis |
| 5,802,530 A | | 9/1998 | Van Hoff |
| 5,805,829 A | | 9/1998 | Cohen et al. |
| 5,818,435 A | | 10/1998 | Kozuka |
| 5,818,447 A | | 10/1998 | Wolf et al. |
| 5,826,102 A | | 10/1998 | Escobar |
| 5,828,839 A | | 10/1998 | Moncreiff |
| 5,842,020 A | | 11/1998 | Faustini |
| 5,845,299 A | | 12/1998 | Arora et al. |
| 5,848,415 A | | 12/1998 | Guck |
| 5,850,446 A | | 12/1998 | Berger et al. |
| 5,854,893 A | | 12/1998 | Ludwig et al. |
| 5,870,544 A | | 2/1999 | Curtis |
| 5,872,915 A | | 2/1999 | Dykes et al. |
| 5,875,322 A | | 2/1999 | House et al. |
| 5,878,223 A | | 3/1999 | Becker et al. |
| 5,889,942 A | | 3/1999 | Orenshteyn |
| 5,909,545 A | * | 6/1999 | Frese et al. ............ 709/208 |
| 5,911,776 A | | 6/1999 | Guck |
| 5,918,012 A | | 6/1999 | Astiz et al. |
| 5,956,491 A | | 9/1999 | Marks |
| 5,956,701 A | | 9/1999 | Habermehl |
| 5,995,093 A | | 11/1999 | Lambourne |
| 6,014,688 A | | 1/2000 | Venkatraman |
| 6,029,164 A | | 2/2000 | Birrell et al. |
| 6,032,150 A | | 2/2000 | Nguyen |

OTHER PUBLICATIONS

Stephen R. Davis. "Teach Yourself Java Programming the Quick and Easy Way with Microsoft Visual: Learn Java Now". Microsoft Press. 3 0402 00136 8093.

Malcolm Graham et al. "Webbed Documents". DOC 95–10/95 Savannah, Georgia, USA.

Chung–Ming Huang et al: "Multimedia E–Mail: The Evolution Approach Based On Adapters" Software Practice & Experience, vol. 24, No. 9, Sep. 1, 1994, pp. 785–800, XPOOO655471 ISSN: 0038–0644 pp. 794, line 3–p. 797, line 2; figures 11,12.

Ouhyoung M et al: "The MOS Multimedia E–Mail System" Proceedings of the International Conference on Multimedia Computing and Systems, May 19, 1994, pp. 315–324, XP002073636 p. 315, right–hand column, line 21–p. 319, left–hand column, line 3; figures 1,2; table 1.

Anonymous: Graphical Command Line. IBM Technical Disclosure Bulletin, vol. 32, No. 8B, pp. 313–314, XP002109975 New York, US in the whole document.

Anonymous: "Editing Word Processor Documents" IBM Technical Disclosure Bulletin, vol. 40, No. 7, pp. 187–188, XP002109976 New York, US.

Brown, Mark; Using Netscape 2, pp 327–375.

Blumfield, Julie R. et al "Step–by–Step to A World–Class Web Site". Windows Magazine. Jul. 1995. vol. 06. No. 08.

Brown, March H. & Robert A. Shillner. "A New Paradigm for Browsing the Web". Mar. 7–11, 1995.

Graham, Malcolm & Andrew Surray. "Webbed Documents". pp.: 58–62. Dated: Oct. 1995.

Tessier, Tom. "Using JavaScript to Create Interactive Web Pages". Dr. Dobb's Journal on CD–ROM.

Using Netscape 2–Special Edition.

* cited by examiner

MINICLIENT FOR INTERNET APPLIANCE

BACKGROUND OF THE INVENTION

1. Field of the Invention

The invention relates to internet appliances.

2. Related Art

An "internet appliance" is a relatively inexpensive, relatively low-powered processor which is capable of connection to a network of computers, the largest of which is commonly known as the "internet" (but such networks may be independent networks or may be part of a private network commonly known as an "intranet"). An internet appliance is typically designed to provide access to services available using the internet, including electronic mail and access to the world wide web. An internet appliance provides such access using client software which interfaces to server software on another, relatively more powerful, processor which has a more direct connection to the internet.

One problem which has arisen in the art is that resource limitations of the internet appliance limit the capability of the internet appliance to provide features in the client software. For a first example, communication link or memory limitations of the internet appliance can limit the ability of the internet appliance to provide quality graphics display. For a second example, memory or processor limitations of the internet appliance can cause the internet appliance to be unable to run applets using Java (or using other applet languages such as ActiveX), or to be unable to provide editing features for graphics or other web page features.

Accordingly, it would be desirable to provide a method and system for providing features for internet access at an internet appliance, notwithstanding resource limitations at the internet appliance. This advantage is achieved in an embodiment of the invention in which desired features are primarily implemented on the server, and coupled to the internet appliance for display, responsive to the ability of the internet appliance to provide those features.

SUMMARY OF INVENTION

The invention provides a method and system for providing features for internet access at an internet appliance which go beyond the resource limitations of the internet appliance. The desired features are primarily implemented on the server, and coupled to the internet appliance for display, responsive to the ability of the internet appliance to provide those features. In particular embodiments, (1) the internet appliance and the server adapt to communication link limitations by dynamically adjusting picture quality or size for graphics to be displayed; (2) the internet appliance and the server adapt to memory and processor limitations by dynamically running applets at the server and intercepting display functions of applets for display at the internet appliance; (3) the internet appliance and the server adapt to memory and processor limitations by dynamically running editing programs or web pages at the server and by dynamically adjusting picture quality or size for graphics to be displayed.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein can be used in conjunction with inventions described in the following applications:

Application Ser. No. 08/918,698, filed Aug. 21, 1997, (pending) in the name of the same inventor, titled "Active Electronic Mail", and Application Ser. No, 08/918,094, filed Aug. 21, 1997, U.S. Pat. No. 6,032,150 in the name of the same inventor, titled "Secure Graphical Objects in Web Documents", Each of these applications is hereby incorporated by reference as if fully set forth herein.

Miniclient and Server

Figure 1:
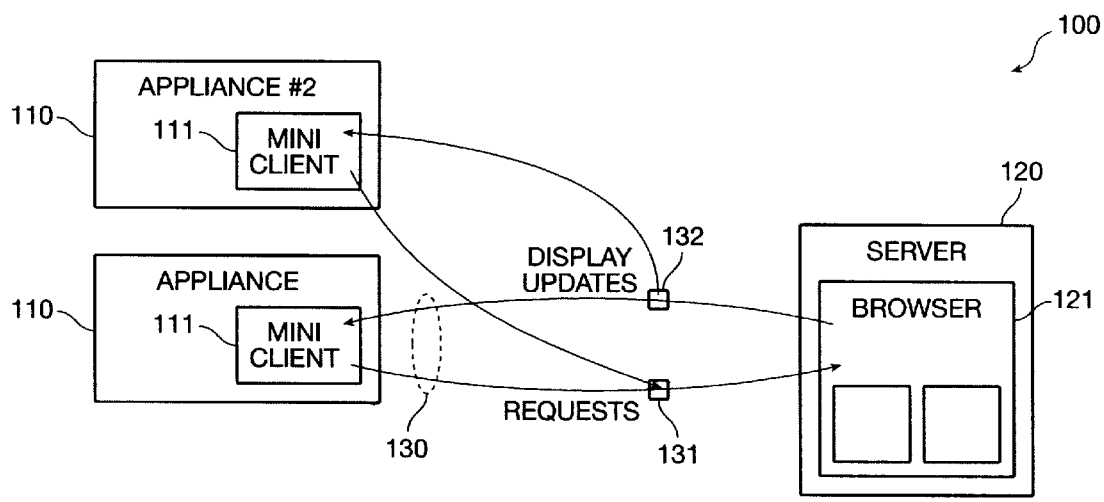
FIG. 1 shows a block diagram of a system including an internet appliance and a server, in use for displaying graphics.

FIG. 1 shows a block diagram of a system including an internet appliance and a server, in use for displaying graphics.

In a system 100 including an internet appliance 110 and a server 120, the internet appliance 110 includes a miniclient 111, while the server 120 includes a full web browser 121.

The miniclient 111 comprises a web client which has been stripped down; it uses only the relatively limited resources of the internet appliance 110 (such as relatively limited memory or processing capability), and consequently has only relatively limited capability. The miniclient 111 is capable of transmitting web requests entered by a user, capable of displaying web pages, in a manner described herein, and capable of other functions described herein.

The web browser 121 comprises a full-featured web client which is able to take advantage of the relatively greater resources of the server 120 (such as relatively greater memory or processing capability), and consequently has capabilities found in web clients which are designed for full-featured computers. In a preferred embodiment, the web browser 121 might have features such as found in Microsoft Corporation's "Internet Explorer" product or Netscape Corporation's "Netscape Navigator" product.

For example, these features might include transmitting web requests entered by the user and transmitted from the internet appliance 110 to the server 120, preparing web pages for display by the miniclient 111 at the internet appliance 110, caching web pages and other web objects for use by the miniclient 111 at the internet appliance 110, and running applets embedded in web pages.

As used herein, the term "web" as used in the phrases "web client", "web page", and the like, refers to information transfer using the hypertext transmission protocol (HTTP), and extensions and variants thereof. The reader is cautioned that HTTP is a rapidly evolving protocol, with many variants and many extensions, modifications, and variants thereof, both official and unofficial. Some of these extensions, modifications, and variants include those which have security features, those which are particular to certain languages or character sets, those which are particular to certain display features, and so on. Not all web browsers are compatible with all extensions, modifications, and variants of HTTP, and it is expected both that further extensions, modifications, and variants of HTTP will continue to develop, and that this lack of industry-wide compatibility will continue for the near future.

Those skilled in the art would be aware, after perusing this application, that the invention is applicable to all such extensions, modifications, and variants of HTTP, without undue experimentation or further invention, and that the scope and spirit of the invention is broad enough to encompass all such applications.

The miniclient 111 and the web browser 121 are coupled by a communication link 130. The miniclient 111 transmits a set of web requests 131 to the web browser 121 on the communication link 130. The web browser 121 receives the web requests 131 and (if they are not already in a dialect of HTTP) transforms them into proper HTTP protocol requests and transmits them to a web server (not shown). The web server serves up web pages and other web objects to the web browser 121, which caches them and prepares them for display by the miniclient. The web browser 121 transmits a set of display updates 132 to the miniclient 111 on the communication link 130. The miniclient 111 receives the display updates 132 and updates its display for presentation to the user.

Displaying Graphics

In a preferred embodiment, the communication link 130 includes a cellular telephone communication circuit or other radiotelephone communication circuit. In alternative embodiments, the communication link 130 includes other communication elements, such as other telephone communication circuits, frame relay or packet radio communication circuits, or other known methods of communication.

The communication link 130 might accordingly be a limited resource, either by bandwidth (because of the quality of the communication circuit), by expense (because of the cost of maintaining the communication circuit), or by availability (because of the physical difficulty of maintaining the communication circuit). For example, in the case the communication link 130 includes a cellular telephone communication circuit or other radiotelephone communication circuit, each minute of communication is relatively expensive, has only limited bandwidth, and may also be subject to periods of unavailability due to the radio transmission environment.

When transmitting the display updates 132, the web browser 121 adjusts a measure of relative quality of the web page to be displayed (or a graphic element therein) in response to the relative quality of the communication link 130. The measure of relative quality might include the relative coarseness or fineness of the graphic element, the relative size of the graphic element, the relative color density of the graphic element, the relative lossiness of compression of the graphic element, or other measures of quality of the graphic element.

In a preferred embodiment, any adjustment to the relative quality of the web page to be displayed can also be made with regard to one or more graphic elements, such as pictures, to be displayed with the web page. Similarly, any adjustment to the relative quality of the web page to be displayed can also be made with regard to text to be displayed with the web page, either by compressing the text or by serving only that text which fits within a display window for the miniclient 111.

In a preferred embodiment, the web browser 121 dynamically measures the relative quality of the communication link 130, such as the bandwidth available using the communication link 130, the cost of using the communication link 130, the bit error rate or other availability measure for the communication link 130, or other measures of relative quality of the communication link 130.

Upon dynamically measuring the relative quality of the communication link 130, the web browser 121 adjusts the display updates 132 to account for that dynamic measure. In a preferred embodiment, the web browser 121 dynamically adjusts the relative quality of the web page (or the graphic element therein) for display, so as to maintain relatively constant a measure of resource usage at the miniclient 111. For example, the measure of resource usage might be the amount of time taken to serve the web page to the miniclient 111 or the monetary cost associated with serving the web page to the miniclient 111.

In alternative embodiments, the miniclient 111 informs the web browser 121 of a display resolution or a display size which is available at the miniclient 111 for web pages, and the web browser 121 adjusts the relative quality of the web page (or the graphic element therein) for display, so as to match the display to the display capability of the miniclient 111. For example, the web browser 121 can adjust the display size of a graphic element so that the graphic element can be displayed at the miniclient 111 without any requirement for scrolling.

The miniclient 111 also has one or more additional commands by which the user can instruct the web browser 121 to adjust the measure of relative quality of the web page for display (or of the graphic element therein) to a selected relatively constant value, or to a selected value associated with a selected relatively constant measure of resource usage at the miniclient 111. Thus, for example, the user can instruct the web browser 121 to display graphic elements at the miniclient 111 at a selected resolution, or can instruct the web browser 121 to display graphic elements at the miniclient 111 so that each web page is served in no more than 50 seconds of cellular air time.

In a preferred embodiment, the miniclient 111 also has one or more additional commands by which the user can also instruct the web browser 121 to continue serving progressive information about the graphic element even after the graphic element is ready for display at the miniclient 111, so that the user can, for example, enter a command (such as a control key or a mouse click), to obtain a relatively better quality or relatively larger size graphic element, or further text which otherwise would not be displayed. In alternative embodiments, the continued serving of progressive information about the graphic element can occur even after the user has spent substantial time reviewing the graphic element.

In a preferred embodiment, a second internet appliance 110 with a second miniclient 111 can duplicate the display of the first miniclient 111 by receiving the display updates 132 and presenting a display which is identical to the first miniclient 111. In alternative embodiments, the second miniclient 111 can also transmit web requests 131 using the communication link 130 (where the communication link 130 is susceptible to such common usage), so that either miniclient 111 can affect the display of the other miniclient 111.

Running Applets

Figure 2:
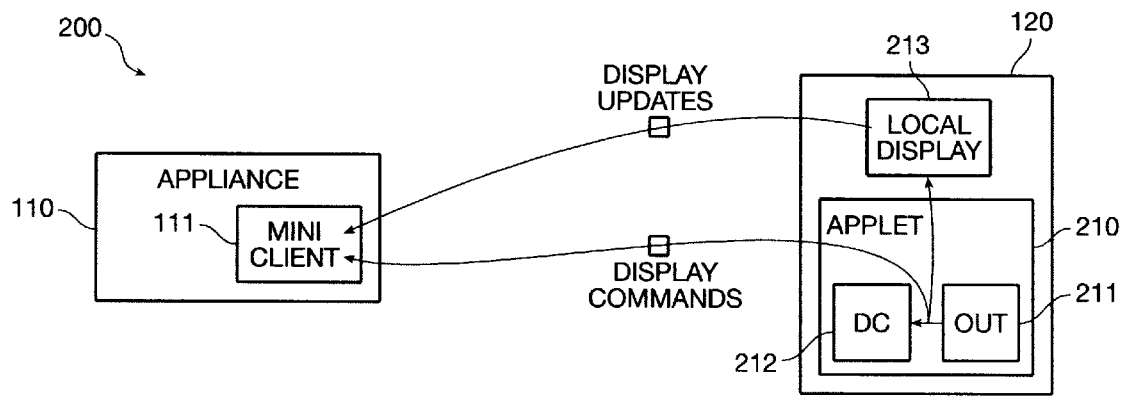
FIG. 2 shows a block diagram of a system including an internet appliance and a server, in use for running applets.

FIG. 2 shows a block diagram of a system including an internet appliance and a server, in use for running applets.

In a system 200 including an internet appliance 110 and a server 120, the internet appliance 110 includes a miniclient 111, while the server 120 includes an applet 210.

Because the miniclient 111 has no Java capability or only relatively limited Java capability, it is desirable to execute the applet 210 on the server 120. The applet 210 includes a set of advanced window tools 211 and a set of display classes 212. In normal operation, the applet 210 provides a local display 213 for the server 120, which if the server 120 were local to the user, would be displayed to the user.

The server 120 dynamically receives the applet 210, such as from a web page which it has accessed at the request of the miniclient 111 (at the behest of the user), and dynamically executes the applet 210 at the server 120. One of two alternative embodiments is preferred.

First, the server 120 may generate the local display 213 and transmit display updates 132 to the miniclient 111 in response thereto.

Second, the server 120 may intercept calls made by the applet 210 from the advanced window tools 211 to the set of display classes 212, and transmit those calls as display commands to the miniclient 111 for execution at the miniclient 111.

In either embodiment, the miniclient 111 is not required to execute or interpret Java code, and is able to display the results of the executing applet 210 as if the applet 210 were actually executing at the miniclient 111.

Editing Applets or Web Pages

Figure 3:
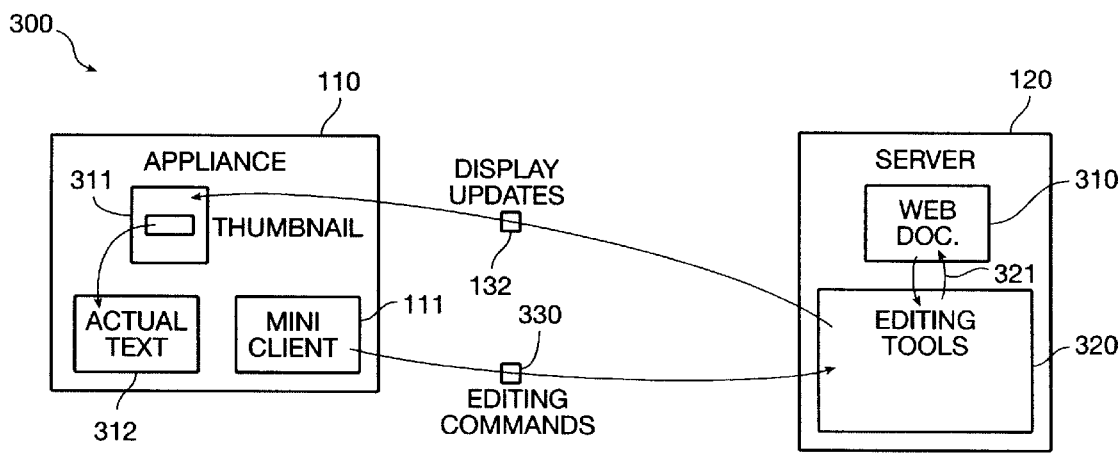
FIG. 3 shows a block diagram of a system including an internet appliance and a server, in use for editing applets or web pages.

FIG. 3 shows a block diagram of a system including an internet appliance and a server, in use for editing applets or web pages.

In a system 300 including an internet appliance 110 and a server 120, the internet appliance 110 includes a miniclient 111, while the server 120 includes web document 310 or other web object.

Because the miniclient 111 has relatively limited memory, it is desirable to maintain the web document 310 and editing tools 320 on the server 120. The miniclient 111 receives editing commands 330 from the user and transmits those editing commands 330 to the server 120.

The server 120 receives the editing commands 330 and passes them to the editing tools 320, which edit the web document 310 at the server 120. The server 120 receives the HTML updates 321 and updates the web document 310, including updating any applets, graphical elements or references to other web objects.

The server 120 dynamically generates a reduced-size ("thumbnail") graphic display 311 of the web document 310, and transmits display updates 132 for the thumbnail graphic display 311 to the miniclient 111. The miniclient 111 dynamically displays the thumbnail graphic display 311 so the user can review changes to the web document 310 as they are made. The server 120 dynamically adjusts quality and size of the thumbnail graphic display 311 as described herein.

Where the web document 310 includes actual text 312, the miniclient 111 receives the actual text 312 from the server 120 and displays the actual text 312 in a separate display window for the user.

Alternative Embodiments

Although preferred embodiments are disclosed herein, many variations are possible which remain within the concept, scope, and spirit of the invention, and these variations would become clear to those skilled in the art after perusal of this application.

I claim:

1. A system including
   a server having a graphic stored thereon;
   a client having a display;
   a communication link coupled to said server and to said client;
   said server including a display update element operative to transmit updates to said display in response to said graphic;
   said display update element being individually responsive to a transmission measure for said communication link and being operative to individually and dynamically adjust a quality measure for said updates in response thereto.

2. A system as in claim 1, wherein said client is an internet appliance.

3. A system as in claim 1, wherein said transmission measure is a bit transmission rate.

4. A system as in claim 1, wherein said quality measure is a measure of picture quality or picture size.

5. A system as in claim 1, wherein said server includes a link measurement element operative to dynamically measure said transmission measure, and wherein said display element is dynamically responsive to said dynamically measured transmission measure.

6. A system as in claim 1, wherein said display update element is operative so that display of a single web page takes substantially constant time.

7. A system as in claim 1, wherein said communication link is associated with a measure of transmission cost, and wherein said display update element is operative so that display of a single web page takes substantially constant cost.

8. A system as in claim 1, wherein said quality measure can vary substantially continuously.

9. A system as in claim 1, wherein said communication link is associated with a measure of transmission cost, and wherein said display update element is operative so that display of a single web page takes substantially constant cost.

10. A system as in claim 1, wherein said graphic includes text.

11. A system as in claim 1, wherein said graphic is an web page and said updates include updates to elements of the web page described in html language.

12. A system as in claim 1, wherein said graphic includes non-image elements.

13. A system including
   a server having a web object stored thereon;
   a client having a display;
   a communication link coupled to said server and to said client;
   said server including a display update element operative to transmit updates to said display in response to said web object;
   said display update element being individually responsive to a transmission measure for said communication link and being operative to individually and dynamically adjust a quality measure substantially smoothly for said updates in response thereto.

14. A system including
   a server having a graphic stored thereon;
   a client having a display;
   a communication link coupled to said server and to said client;
   said server including a display update element operative to transmit updates to said display in response to said graphic;

said display update element being individually responsive to a transmission measure for said communication link and being operative to individually and dynamically adjust a quality measure substantially smoothly for said updates in response thereto.

15. A system as in claim 14, wherein said client is an internet appliance.

16. A system as in claim 14, wherein said transmission measure is a bit transmission rate.

17. A system as in claim 14, wherein said quality measure is a measure of picture quality or picture size.

18. A system as in claim 14, wherein said server includes a link measurement element operative to dynamically measure said transmission measure, and wherein said display update element is responsive to said dynamically measured transmission measure.

19. A system as in claim 14, wherein said display update element is operative so that display of a single web page takes substantially constant time.

20. A system including
a server having an editing program stored thereon, said editing program including source code for a displayable page, said source code being associated with at least one graphic;
a client having a display element;
a communication link coupled to said server and to said client;
said client being operative to transmit editing commands to said editing program and to receive updates to said graphic from said server in response to said editing commands;
said display element being responsive to said updates, being responsive to a transmission measure for said communication link, and being responsive to adjust a graphic quality measure for said updates in response thereto.

21. The claim of claim 20 wherein said quality measure can be adjusted substantially smoothly.

* * * * *

UNITED STATES PATENT AND TRADEMARK OFFICE
CERTIFICATE OF CORRECTION

PATENT NO. : 6,564,250 B1  Page 1 of 1
APPLICATION NO. : 08/918096
DATED : May 13, 2003
INVENTOR(S) : Julien T. Nguyen It is certified that error appears in the above-identified patent and that said Letters Patent is hereby corrected as shown below:

On the left column of page 2 and before "OTHER PUBLICATIONS", add the following:

--5,963,217 A 10/1999 Grayson--
--5,835,683 A 11/1998 Corella et al.--
--5,768,505 A 06/1998 Gilchrist et al.--
--5,809,512 A 09/1998 Kato--
--5,204,947 A 04/1993 Bernstein--
--5,572,643 A 11/1996 Judson--
--5,574,843 A 11/1996 Gerlach Jr.--
--5,630,060 A 05/1997 Tang et al.--
--5,680,619 A 10/1997 Gudmundson--
--5,694,163 A 12/1997 Harrison--

Signed and Sealed this
Twelfth Day of April, 2011

David J. Kappos
*Director of the United States Patent and Trademark Office*